United States Patent
Kwon et al.

(10) Patent No.: US 6,945,100 B2
(45) Date of Patent: Sep. 20, 2005

(54) SCANNING PROBE MICROSCOPE WITH IMPROVED PROBE TIP MOUNT

(75) Inventors: Joonhyung Kwon, Gunpo (KR); Young Seok Kim, Seoul (KR); Sang-il Park, Sungnam (KR)

(73) Assignee: PSIA Corporation, Sungnam (KR)

(*) Notice: Subject to any disclaimer, the term of this patent is extended or adjusted under 35 U.S.C. 154(b) by 0 days.

(21) Appl. No.: 10/748,827

(22) Filed: Dec. 29, 2003

(65) Prior Publication Data

US 2004/0140424 A1 Jul. 22, 2004

Related U.S. Application Data

(63) Continuation of application No. 10/077,835, filed on Feb. 15, 2002, now Pat. No. 6,677,567.

(51) Int. Cl.⁷ ............................ G01N 13/16; G01B 5/28
(52) U.S. Cl. ....................... 73/105; 73/866.5; 250/306
(58) Field of Search ............................... 73/105, 866.5; 250/306

(56) References Cited

U.S. PATENT DOCUMENTS

| | | |
|---|---|---|
| 3,600,811 A | 8/1971 | Weyrauch |
| 5,103,095 A | 4/1992 | Elings et al. |
| 5,157,251 A | 10/1992 | Albrecht et al. ............ 250/216 |
| 5,210,410 A | 5/1993 | Barrett |
| 5,376,790 A | 12/1994 | Linker et al. ............... 250/306 |
| RE35,514 E | 5/1997 | Albrecht et al. ............ 250/216 |
| 5,666,051 A | 9/1997 | Junker et al. |
| 5,672,816 A | 9/1997 | Park et al. |
| 5,705,814 A | 1/1998 | Young et al. ............... 250/306 |
| 5,714,756 A | 2/1998 | Park et al. ................... 250/306 |
| 5,854,487 A | 12/1998 | Braunstein et al. ......... 250/306 |
| 5,877,891 A | 3/1999 | Park et al. ................... 359/372 |
| 5,939,709 A | 8/1999 | Ghislain et al. |
| 5,939,719 A | 8/1999 | Park et al. .................. 250/306 |
| 5,948,972 A | 9/1999 | Samsavar et al. |
| 6,057,546 A | 5/2000 | Braunstein et al. ......... 250/306 |
| 6,057,547 A | 5/2000 | Park et al. ................... 250/307 |
| 6,144,028 A | 11/2000 | Kley |
| 6,169,281 B1 | 1/2001 | Chen et al. |
| 6,185,991 B1 | 2/2001 | Hong et al. |
| 6,310,342 B1 | 10/2001 | Braunstein et al. ......... 250/306 |
| 2001/0029674 A1 | 10/2001 | Cutler |
| 2002/0092340 A1 * | 7/2002 | Prater et al. ............... 73/24.02 |
| 2002/0148955 A1 | 10/2002 | Hill |
| 2003/0015653 A1 * | 1/2003 | Hansma et al. ............. 250/234 |

OTHER PUBLICATIONS

Binnig G., et al, "Atomic Force Microscope", Physical Review Letters, vol. 56, No. 9, Mar. 3, 1986 pp. 930–933.

Hansma, P.K., et al, "A new optical–lever based atomic force microscope", J. Appl. Phys., 76(2) Jul. 15, 1994, American Institute of Physics, pp. 796–799.

Meyer, Gerhard et al, "Erratun: Novel optical approach to atomic force microscopy", Appl. Phys. Lett. 53(24), Dec. 12, 1988, American Institute of Physics, pp. 2400–2402.

"Dimensions 3100 Scanning Probe Microscope The Most Versatile SPM Ever Manufactured", www.di.com/Products.Dim/3100/D3100Main.html, Digital Instruments, Veeco Metrology Group © 1998–2001, print date Dec. 17, 2001, 4 pages.

(Continued)

*Primary Examiner*—Daniel S Larkin
(74) *Attorney, Agent, or Firm*—Silicon Valley Patent Group LLP (57) ABSTRACT

A mounting mechanism for the probe tip of a Scanning Probe Microscope (SPM) includes a scanner supported by a stationary frame, and a kinematic mechanism supported by the scanner. The kinematic mechanism includes at least three protrusions and at least one magnet. The mounting mechanism for the probe tip also includes a chip mount having a hole, a slot and a flat surface. The chip mount, on being held by the magnet, provides an easy way to mount the probe tip without requiring any tools.

18 Claims, 13 Drawing Sheets

OTHER PUBLICATIONS

"Dimension 3100 Scan Techniques Unparalleled Power and Versatility", www.di.com/Products/Dim/3000/D31.scantechniques.html, Digital Instruments Veeco Metrology Group, © 1998–2001, print date Dec. 17, 2001, 2 pages.

AutoProbe M5™ Scanning Probe Microscope, Microscopes Veeco Metrology Group, 2001 © TM Microscopes, Veeco, 4 pages.

"TappingMode Imaging: Application and Technology", www.di.com/AppNotes/TapMode/TapModeMain.html, Digital Instruments, Veeco Metrology Group, © 1995–2001, Digital Instruments, print date Dec. 17, 2001, 5 pages.

"NanoScope Vertical Engage Scanner", www.di.com/Products/Mult/JVScanner.html, Digital Instruments Veeco Metrology Group, © 1996–2001, Digital Instruments, print date Dec. 17, 2001, 1 page.

"NanoScope MultiMode Scanning Probe Microscope", www.di.com/products/Multi/MMAlone.html, Digital Instruments Veeco Metrology Group, © 1996–2001, Digital Instruments, 8 page.

"NanoScope ® MultiMode™ SPM The World's Highest Resolution SPM", www.di.com/Products/Multi/MMMain.html, Digital Instruments Veeco Metrology Group, © 1995–2001, Digital Instruments, print date Dec. 17, 2001 7 pages.

"Products", Digital Instruments, Veeco Metrology Group Products, www.di.com/products2/products_all.html, print date Dec. 17, 2001, 5 pages.

"AutoProbe CP Research The Most Flexible Research SPM", www.theermomicro.com/products/cp.htm, Microscopes Veeco Metrology Group, © 2001, print date Dec., 17, 2001, 2 pages.

Manalis, S. R., et al, "High–speed atomic force microscopy using an integrated actuator and optical lever detection", Rev. Sci. Instrum. 67(9), Sep. 1996, pp. 3294–3297.

"Microlevers™ General Purpose Cantilevers", Park Scientific Instruments © 1998, 1 page.

Babcock, K.L. et al. "Phase Imaging: Beyond Topography", Digital Instruments, 3 pages, published prior to Feb. 15, 2002.

"AutoProbe CP Research AP 2001", ThermoMicroscopes, 5 pages, published prior to Feb. 15, 2002.

"AutoProbe CP Research Scanning Probe Microscope", ThermoMicroscopes, 4 pages, published prior to Feb. 15, 2002.

"AutoProbe M5E AP–5001", ThermoMicroscopes, 4 pages, published prior to Feb. 15, 2002.

"The Dimension™ 5000 Scanning Probe Microscope", Digital Instruments, 8 pages, published prior to Feb. 15, 2002.

"The Dimension™ 3000 Scanning Probe Microscope", Digital Instruments, 6 pages, published prior to Feb. 15, 2002.

"The Dimension™ 3100 Scanning Probe Microscope", Digital Instruments, 1 page, published prior to Feb. 15, 2002.

* cited by examiner

SCANNING PROBE MICROSCOPE WITH IMPROVED PROBE TIP MOUNT

This application is a continuation of U.S. patent application Ser. No. 10/077,835 filed on Feb. 15, 2002, now U.S. Pat. No. 6,677,567 by Jaewan Hong et al, that is incorporated by reference herein In its entirety.

BACKGROUND OF THE INVENTION

The Scanning Probe Microscope (SPM) is a powerful instrument in the nanometer scale science and technology. Among the many variations of SPM, the Atomic Force Microscope (AFM) is the most widely used and the most fundamental version. One prior art AFM is described in an article by G. Binnig, C. Quate, and Ch. Gerber in Phys. Rev. Lett. 56, 930 (1986). AFM has evolved since then, refining its capabilities and conveniences. In a commonly used configuration, a prior art AFM has a micro-machined cantilever with a sharp tip on its edge, and the AFM scans the sample or the cantilever with a piezoelectric tube. The deflection of the cantilever is measured by the AFM casting a laser beam on the cantilever and detecting the reflected beam with a position sensitive photo detector (PSPD). (See the article by G. Meyer and N. M. Amer, in Appl. Phys. Lett. 53, 2400 (1988).)

In such a configuration, the AFM has a high vertical sensitivity and is relatively easy to implement. In order to adjust the incident laser beam to fall on the cantilever and make the reflected beam hit the center of PSPD, an aligning mechanism with fine screws is used. A probing unit, including such an aligning mechanism plus the laser, PSPD, and cantilever, has considerable mass and it is difficult for the AFM to scan the probing unit at sufficiently high speed while maintaining accuracy. In the prior art, typical x scan speed is in the range of 0.1 Hz~4 Hz and necessary z servo bandwidth is 100 Hz~1 kHz. Such scan speed is acceptable but not satisfactory for the reasons discussed below. Therefore in certain conventional AFMs, the probing unit was kept stationary and the sample was scanned along x, y and z axes. See U.S. Pat. No. 5,157,251 granted to Albrecht et al. and U.S. Pat. No. 5,237,859 granted to Elings et al., both of which are incorporated by reference herein in their entirety.

However, large samples, such as large silicon wafers, cannot be scanned fast enough e.g. 1 KHz in z direction for sufficient vertical servo frequency response. For a description of this problem, see for example, U.S. Pat. No. 5,463,897 column 2, line 19–24. See also an article by P. K. Hansma, B. Drake, D. Grigg, C. B. Prater, F. Yashar, G. Gurley, and V. Elings, S. Feinstein, and R. Lal, J. Appl. Phys. 76, 796 (1994). The cantilever may be scanned while ensuring that the laser beam follows the cantilever motion to solve this problem. A simple method is miniaturizing the aligning mechanism, and scanning the whole probing unit. Such a scanning probe is implemented in the "AutoProbe M5" scanning probe microscope available from TM Microscopes, Veeco Metrology Group, 1171 Borregas Avenue, Sunnyvale, Calif. 94089, USA and described on the Internet at www.tmmicro.com.

However, such a miniaturized probing unit still has a considerable mass and it degrades the z servo response. It is also inconvenient to align the laser beam with tiny screws and a special tool had to be used. Another method is attaching lenses on the tube scanner such that the laser beam follows the cantilever motion and the reflected beam hits the same point on the PSPD. Such a tube scanner is implemented in the "Dimension 3100" microscope available from Digital Instruments, Veeco Metrology Group, 112 Robin Hill Road, Santa Barbara, Calif. 93117 and described on the Internet at www.di.com. See also U.S. Pat. No. 5,463,897 granted to Prater et al. which is incorporated by reference herein in its entirety. See also the article by P. K. Hansma, B. Drake, D. Grigg, C. B. Prater, F. Yashar, G. Gurley, and V. Elings, S. Feinstein, and R. Lal, J. Appl. Phys. 76, 796 (1994). However in this method, the laser beam does not perfectly follow the cantilever and the reflected beam does not remain on the exact same point on the PSPD, causing measurement errors and tracking force variations during x-y scan.

In addition, most AFMs have the common problems of scanning errors and slow scanning speed. A piezoelectric tube-based scanner commonly used in the prior art is not an orthogonal 3-dimensional actuator that can be moved in any of the three dimensions x, y and z independent of one another. Since the x-y motion relies on the bending of the tube, there is non-linearity and cross talk between x-y and z axes. AFMs can use position sensors to correct the intrinsic non-linearity of the piezoelectric tube as described in U.S. Pat. No. 5,210,410 granted to Barrett, and incorporated by reference herein in its entirety; see also an article by R. Barrett in Rev. Sci. Instrum. 62, 1393 (1991). However, z cross talk from flexing the tube cannot be eliminated and it causes background curvature effect and measurement errors. Using a tripod scanner does not improve the non-linearity and cross talk problem much. Furthermore the piezoelectric tube-based scanner has low resonance frequency (typically below 1 kHz) and does not have high force to drive a conventional probing unit at high speed.

In order to improve the orthogonality of the scanner, U.S. Pat. Nos. 6,310,342, 6,057,546 and 5,854,487 all granted to Braunstein, et al. (each of which is incorporated by reference herein in its entirety) describe the prior art use of a flexure stage for x-y scanning. However, since the z scanner described by Braunstein et al. is attached to the x-y scanner, the z scanner cannot move faster than the resonance frequency of the x-y scanner, which is about 100 Hz.

As mentioned above, the scanning speed of AFM is important. The scanning speed of AFM is usually limited by the z servo frequency response as described below. The z scanner needs to follow the sample features with appropriate feedback controller. As the scan speed in x direction is increased, the z scanner has to move up and down faster, requiring higher bandwidth in z servo system. However, the vertical servo frequency response cannot be higher than the resonance frequency of the z scanning system. z-scanning system means the z scanner and the supporting structure for the z scanner plus whatever the z scanner has to move in z direction. The resonance frequency of the z scanning system is reduced as more mass is loaded on to the z scanner. If the z scanner has higher push-pull force, the resonance frequency is reduced less.

Typical AFM has a few hundred Hz bandwidth in z servo system. Let's consider the case of 512 Hz. If we want to take a 256×256 pixel image, we can scan 1 Hz in x direction. (forward 256 plus backward 256) Of course, we can scan faster if the sample is smooth so that there is not much height variation between adjacent data points. Since we need to collect 256 lines of data, it takes 256 seconds (about 4 min.) to finish one scan. 4 min is a long time, and it is important to increase the scan speed. Typically, x-y scan speed is not limited by the x-y scanner bandwidth but limited by the z servo frequency response.

In AFMs, it is necessary to replace the cantilever frequently. The micro-machined cantilever is attached on a small chip (2×4 mm), and it is difficult to handle even with a tweezers. In order to improve the handling, the cantilever chip was mounted on an aluminum plate in the prior art. See U.S. Pat. No. 5,376,790 granted to Linker et al.; See also TM Microscopes CP, M5. Such a prior art plate had three slots, whose angles are 120° apart. These slots make contact with three balls. A spring clip was used to hold the chip mount. In another prior art (see TM Microscopes Explorer; see also U.S. Pat. No. 5,319,960 granted to Gamble et al.), a magnet was used to hold the chip mount but the chip mount sit directly on the magnet, which does not ensure the same cantilever position after replacement. Young et al. (see U.S. Pat. No. 5,705,814) have used a complicated method to align the cantilever.

Furthermore, the AFM head needs to be removed from the AFM frame from time to time. For convenient mount and un-mount of the AFM head, a dovetail groove has been made on the AFM head and a dovetail rail has been attached on the frame in the prior art. See, for example, TM Microscopes, CP; Digital Instruments, Dimension 3100. Since the AFM head needs to be firmly mounted on the frame, a fastening screw was used to tighten the dovetail.

SUMMARY

A scanning probe microscope in accordance with the invention uses two different scanners that are completely detached each from the other, and are physically mounted at separate locations on a stationary frame. One scanner (called "x-y scanner") scans a sample in a plane (also called "x-y plane"), while the other scanner (called "z scanner") scans a probe tip (which is supported at a free end of a cantilever) in a direction (also called "z direction") perpendicular to the plane. Detachment of the two scanners from one another ensures that each scanner can be moved (relative to the frame) without affecting the other scanner.

Depending on the embodiment, the scanning probe microscope may include a light source to illuminate a cantilever that supports the probe tip, and a photodetector to receive a portion of light reflected by the cantilever, thereby to sense the deflection of the cantilever. The light source and the photodetector may be supported at locations horizontally separated from a vertical line of movement of the probe tip. In one embodiment, a reflective element (such as a prism) is located along the vertical line of movement of the probe tip, and the light source is horizontally aimed at the reflective element, so that the same spot on the cantilever is illuminated (in the downward direction in this embodiment), regardless of vertical movement of the cantilever by the scanner.

In such an embodiment, light reflected by the cantilever may be directed to the photodetector via one or more optical elements. For example, a mirror may be used to reflect light from the cantilever horizontally on to the photodetector. In this example, an error in the position detected by the photodetector due to the z scanner movement may be corrected by software. As another example, two parallel mirrors located horizontally across from one another may be used between the cantilever and the photodetector, so that light reflected by the cantilever is at the same angle as light incident on the photodetector. Therefore, in this example, the same spot on the photodetector (e.g. the center) is illuminated, regardless of vertical movement of the z scanner (on which the cantilever and photodetector are mounted).

Also depending on the embodiment, the light source, the photodetector and any intermediate optical elements in a path therebetween may be located vertically close to the cantilever, to accommodate an objective lens and a camera along a line of movement of the probe tip, thereby to provide a direct on-axis view of a sample under evaluation.

DETAILED DESCRIPTION

Figure 1:
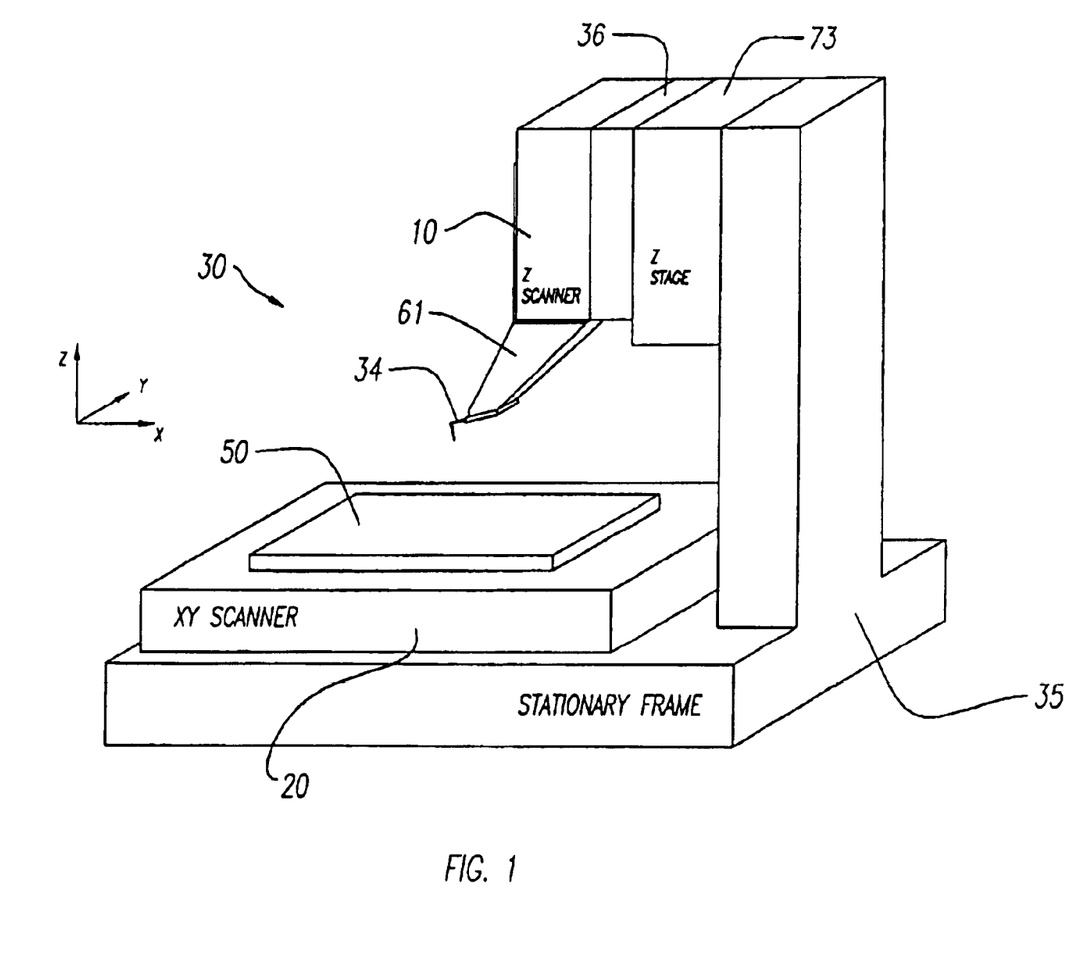
FIG. 1 illustrates, in a conceptual diagram, a scanning probe microscope with a z scanner separated from an x-y scanner in accordance with one aspect of the invention.

A scanning probe microscope 30 in accordance with the invention physically separates a z scanner 10 from an x-y scanner 20, as shown in FIG. 1. Scanners 10 and 20 are mounted on a common frame 35 that is stationary, although in an alternative embodiment, they may be mounted on different frames. There is also a z-stage 73 between scanner 10 and scanner 20. The z-stage 73 is a one dimensional translation stage with a stepper motor and is used to bring a probe tip (mounted on a cantilever that in turn is mounted on a z scanner) close enough to a sample on a sample chuck 50 so that the sample surface can be reached within z scanner range. Regardless of how they are mounted, the two scanners 10 and 20 are physically detached from one another (i.e. are not mechanically coupled, except that both are coupled to a stationary frame 35 and each provides motion relative to the frame independent of the other).

Such physical separation of x-y scanner 20 from z scanner 10, in a scanning probe microscope of the type described above, has a number of advantages over integration of both scanners into a single head as described by Braunstein, et al. in U.S. Pat. Nos. 6,310,342, 6,057,546 and 5,854,487. In contrast to use of Braunstein et al.'s head carrying the two scanners, z scanner 10 (FIG. 1) can be moved much faster and more accurately.

One embodiment of microscope 30 uses a two-dimensional flexure stage 20 to scan a sample chuck 50 (e.g. holding a silicon wafer) in x-y direction only, and a one dimensional piezoelectric actuator 10 to scan a probe cantilever 34 in the z direction only. In FIG. 1. the z scanner 10 is shown attached to a probing head 36 that in turn is shown attached to z stage 73.

An example of flexure stage 20 is model P-730 stage available from PI, http://www.pi.ws. Such a flexure stage 20 has a high orthogonality, and can scan large samples (~2 kg) up to 100 Hz in x-y direction. This scan speed is sufficient because the bandwidth requirement for x-y axes is much lower than for z axis. In one embodiment, a stacked piezoelectric actuator 10 used as z scanner has a high resonance frequency (>10 kHz) with high push-pull force when appropriately pre-loaded.

Figure 2:
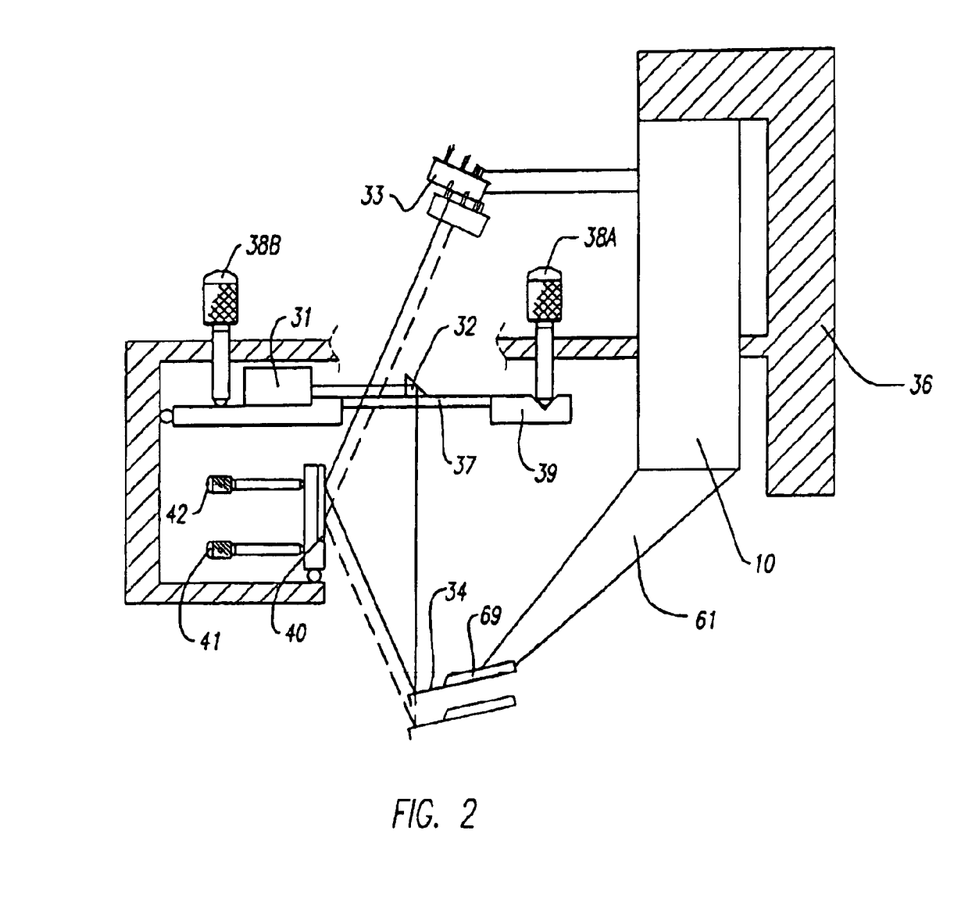
FIGS. 2–4 illustrate, in side elevation views, the locations of a laser, a prism, a cantilever beam, a steering mirror and a photodetector all used in the scanning probe microscope FIG. 1, in three different embodiments.

In one embodiment, microscope 30 includes a laser 31, laser beam aligning mechanism (such as a prism) 32, and a photodetector (such as a position sensitive photo detector (PSPD)) 33. Photodetector 33 is supported by z scanner 10 that also supports cantilever 34. This arrangement in microscope 30 is provided to ensure that a laser beam falls on the same point on a cantilever 34, and the reflected beam hits the same point on the photodetector 33 regardless of the motion of z scanner 10. Therefore, only the deflection of cantilever 34 is monitored on photodetector 33. In the embodiment of FIG. 2, laser 31 and laser beam aligning mechanism 32 are fixed on the probing head.

The laser beam from laser 31 is reflected by laser beam aligning mechanism 32, mounted on a glass plate 37. The angle of glass plate 37 (and therefore of laser beam aligning mechanism 32) relative to cantilever 34 can be adjusted by two screws 38A and 38B located on the two diagonal corners of a glass plate holder 39. Since the laser beam is falling on cantilever 34 from the vertical direction, the beam always hits the same point on cantilever 34, regardless of motion of z scanner 10.

The reflected beam from cantilever 34 is bounced by a steering mirror 40 and hits photodetector 33. Mirror 40 of FIG. 2 is supported by the probing head 36, at a position offset from the vertical line passing through laser beam aligning mechanism 32. The angle of steering mirror 40 can be slightly adjusted by two screws 41 and 42 on its diagonal edges such that the bounced beam hits the center of photodetector 33. Since the steering mirror 40 is vertically mounted, the bounced beam always hits the same point on photodetector 33, regardless of z scanner motion, and therefore only the deflection of the cantilever is detected by photodetector 33.

Figure 3:
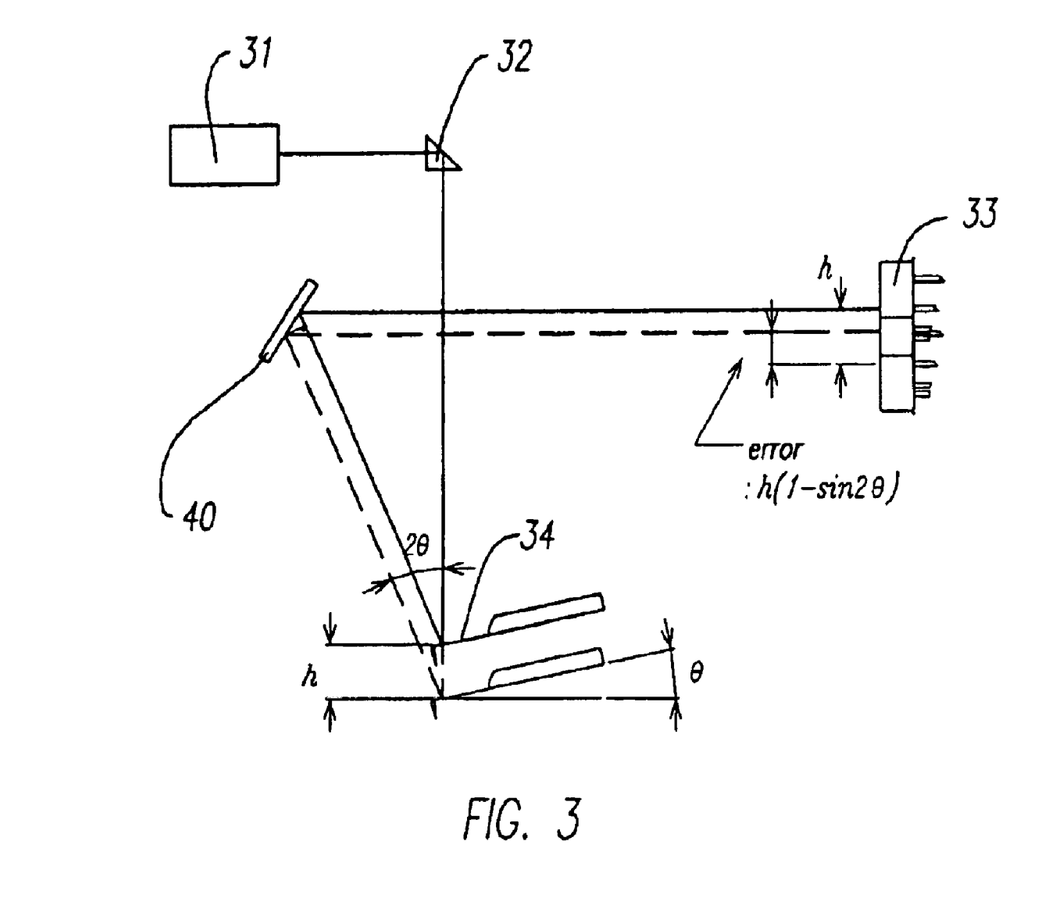

In one embodiment, to accommodate an optical microscope, a clearance is provided above the cantilever 34. For this purpose, the position of photodetector 33 is lowered relative to laser 31 as shown in FIG. 3. Moreover, the steering mirror 40 is mounted at an angle to the vertical (e.g. 45°) such that the path of bounced laser beam becomes horizontal as shown in FIG. 3. However, in this configuration, the spot formed by the bounced laser beamon the photodetector 33 changes, as z-scanner 10 moves. When z scanner 10 moves a distance h, there is an error of $h(1-\sin 2\theta)$ in the position of the laser beam spot on the photodetector 33 as shown in FIG. 3. This amount of error is very small compared to the amount of the laser beam spot displacement when the cantilever 34 is deflected by h, because changing the angle of the reflected laser beam causes much greater displacement of the laser beam spot on photodetector (typically 500 times more). Please note that h is exaggerated very much in the drawing to illustrate the beam path change. For example, h is a very small amount like a few nm to a few $\mu$m, while the length of the cantilever is about 100 $\mu$m.

Of course, this error disappears in some embodiments wherein the steering mirror 40 is attached to z scanner. However, scanning only the cantilever 34 and photodetector 33 with the z scanner in certain embodiments increases bandwidth as compared to also scanning the steering mirror 40 which significantly increases mass and reduces the z-bandwidth.

Figure 4:
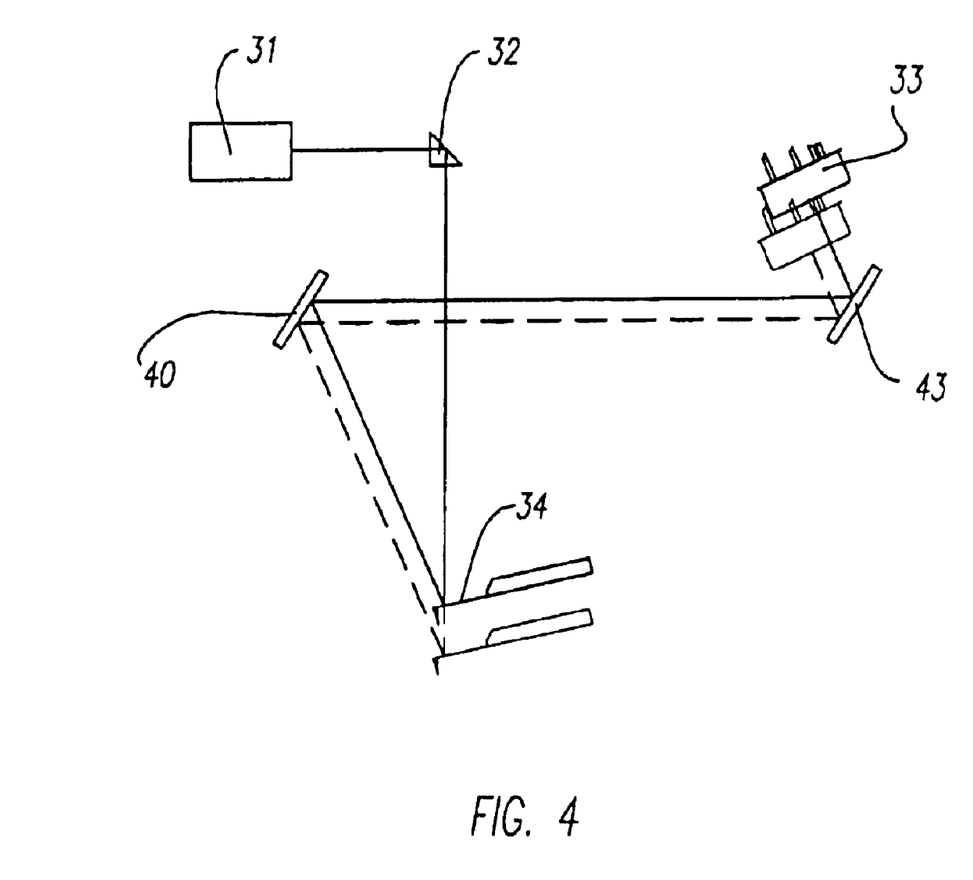

Since z scanner motion h is a known quantity, it is possible to compensate for error $h(1-\sin 2\theta)$ in software. An alternative method is to eliminate such error by introducing another mirror 43 (FIG. 4) whose angle is parallel to the angle of steering mirror 40 and the photodetector 33 is aimed at mirror 43. In the configuration of FIG. 4, second mirror 43 exactly compensates the effect of first mirror 40, and therefore the laser beam hits the same point on photodetector 33 regardless of z scanner motion.

Figure 5A:
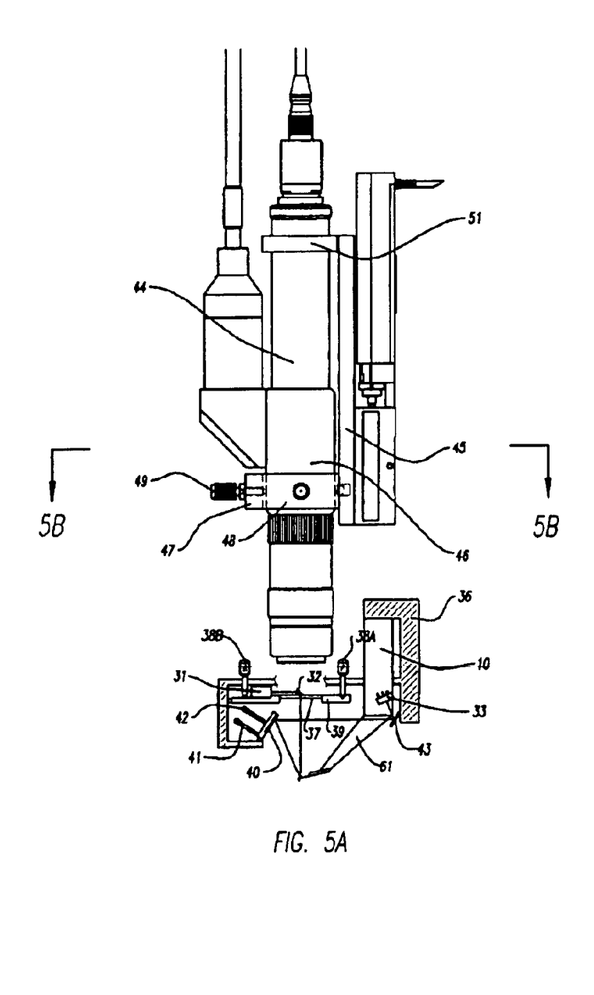
FIG. 5A illustrates, in a side elevation view, a scanning probe microscope including optical elements for direct on-axis view of the sample under evaluation, in accordance with another aspect of the invention.

Therefore, the space above prism 32 (FIG. 4) is now available for installation of a direct on-axis optical microscope, as shown in FIG. 5A. The optical path from the sample held by a sample chuck (not shown in FIG. 5A) to the camera is on a vertical line passing through cantilever 34. In this embodiment, an upper part 44 of this optical microscope is flexibly mounted (via a flexible mount 51) to a focusing stage 45 and a lower part 46 is held by a U-shaped bracket 47 (FIG. 5B), which has two screws 48 and 49 on two of its sides. Two spring plungers (not labeled in FIG. 5B) that push against part 46 opposite to screw 48, and two additional spring plungers in focusing stage 45 push against part 46 opposite to screw 49. This arrangement permits the optical microscope to be panned by manually adjusting just two screws 48 and 49. The distance from the pivoting point to the focal plane is over 200 mm, while the panning distance is less than ±0.5 mm. Therefore the maximum variation of the focal plane during panning is less than 1 $\mu$m, which is within the focal depth of the optical microscope.

Figure 5B:
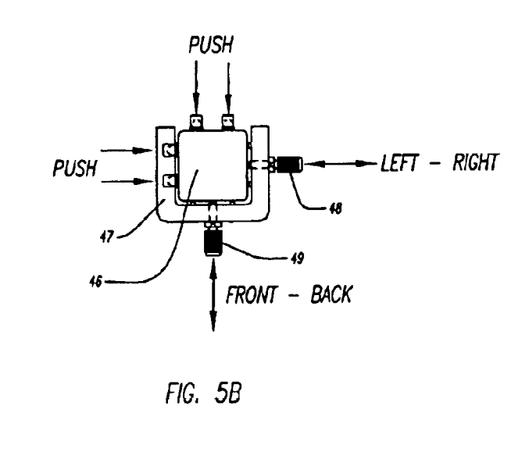
FIG. 5B illustrates, in a cross-sectional view in the direction 5B—5B in FIG. 5A, flexible mounting of an on-axis optics module on to a focusing stage by a bracket of one embodiment.

In contrast to the embodiment illustrated in FIGS. 5A and 5B, in some conventional large sample AFMs (such as TM Microscopes, M5; Digital Instruments, Dimension 3100; see also U.S. Pat. No. 5,463,897 granted to Prater et al. and U.S. Pat. No. 5,705,814 granted to Young et al. both incorporated by reference herein in their entirety), an oblique mirror is inserted between the cantilever and the objective lens. Since an oblique mirror may have defects and does not fully cover the light path, the quality of such an optical microscope in the prior art is degraded. In order to pan the view with such a prior art optical microscope, the objective lens had to be moved out of its optical axis, introducing significant blurring. Such blurring is avoided by the embodiment illustrated in FIGS. 5A and 5B, due to the fact that all optical elements—objective lens, tube lens, and CCD camera—are fixed on a single body, and move together during panning, and because of the above-described minimal change in focal depth during panning.

The specific embodiment illustrated in FIGS. 5A and 5B has the following advantages (although other embodiments may have fewer or greater advantages): 1) Scan accuracy: there is no cross talk between the x-y and z axes, and we can achieve high scan accuracy. 2) Sample size: since the sample is scanned only in x-y direction, large samples as well as small samples can be scanned at sufficiently high speed. 3) Scan speed: since z scanner has high resonance frequency with high force, while it need to scan only the cantilever and PSPD, the z servo frequency response is much greater than in the prior art. 4) Convenience: the laser beam aligning mechanism is fixed on a probing head, to allow such mechanism to be sufficiently large for convenient and precise adjustment without any tools. 5) Optical vision: since there is enough clearance above the cantilever, it is possible to accommodate a direct on-axis optical microscope. 6) Panning: by using a single body optical microscope with a bracket, the image of optical microscope remains at high quality.

Figure 5C:
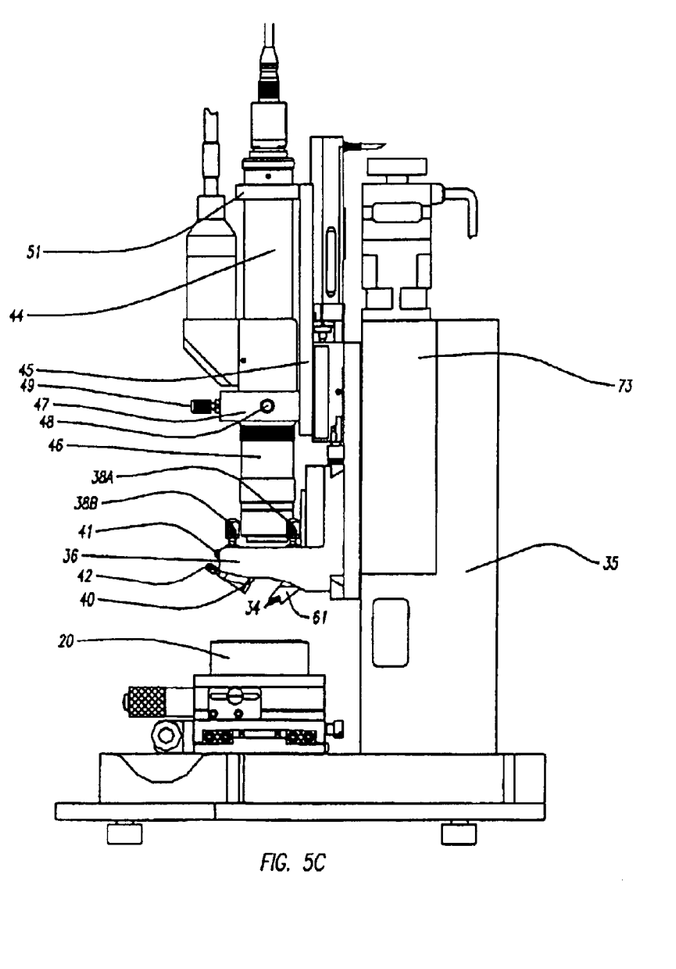
FIGS. 5C, 5D and 5E illustrate, in a side view, a front view, and a top view respectively, an assembly of a scanning probe microscope of the type illustrated in FIGS. 5A and 5B, including the x-y scanner and the stationary frame.
Figure 5D:
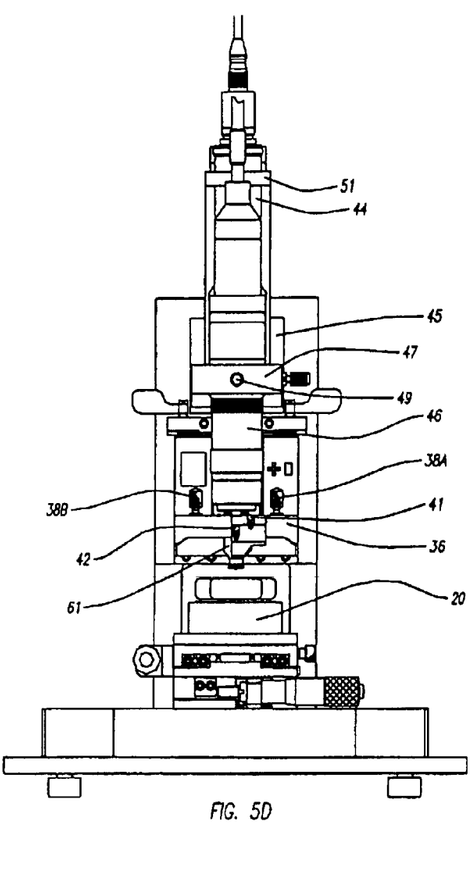
Figure 5E:
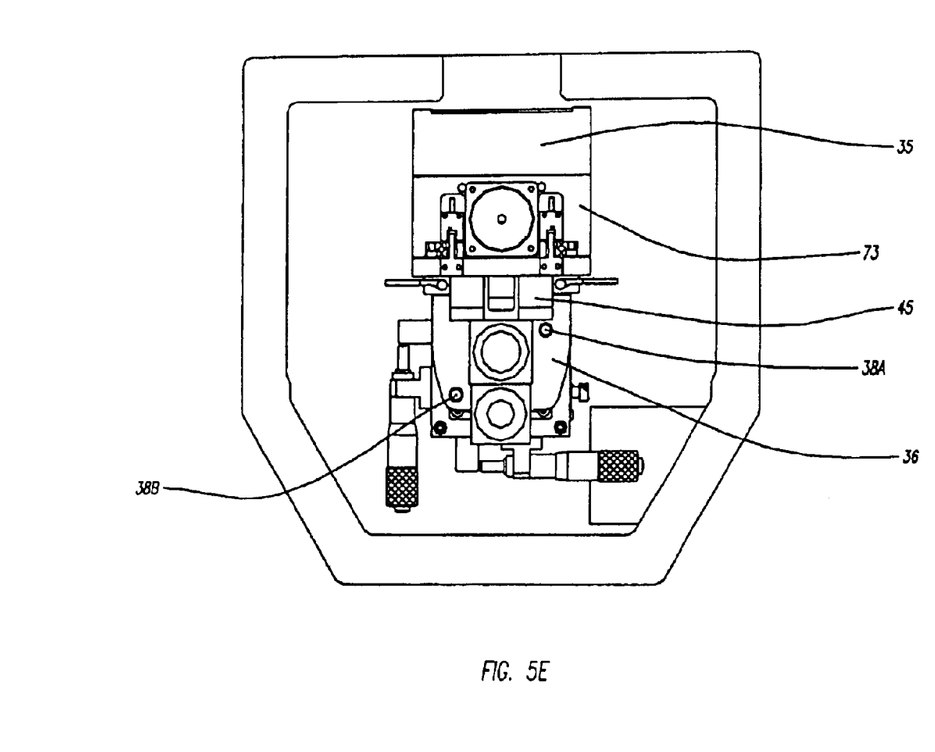

FIGS. 5C, 5D and 5E illustrate, in a side view, a front view, and a top view respectively, an assembly of a scanning probe microscope of the type illustrated in FIGS. 5A and 5B, including x-y scanner 20 and stationary frame 35.

Figure 6A:
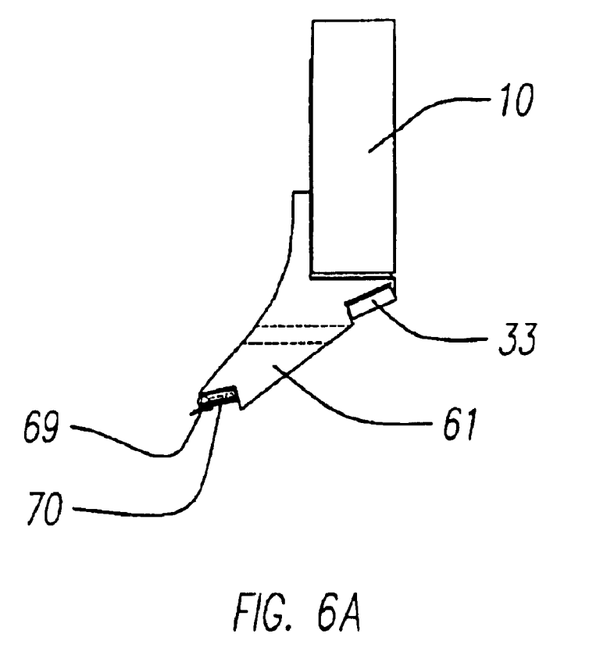
FIGS. 6A–6C illustrate, in a side elevation view, an enlarged bottom view and a side view of the bottom, respectively, an end of a probe arm configured for kinematic mounting of a cantilever chip mount.
Figure 6B:
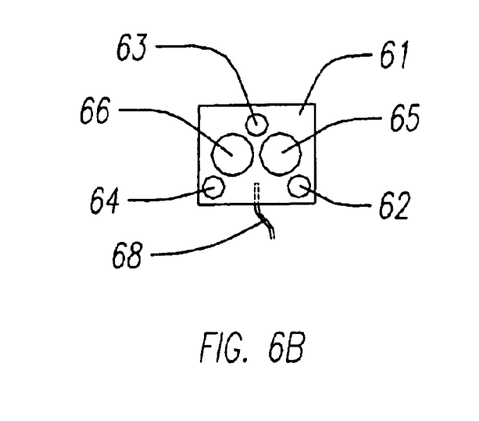
Figure 6C:
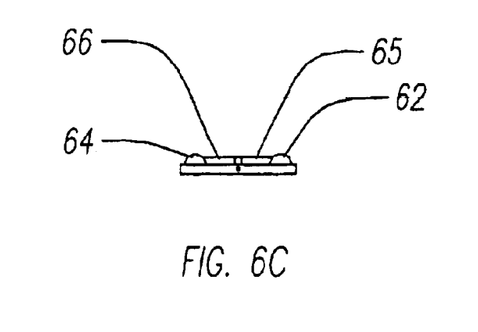
Figure 6D:
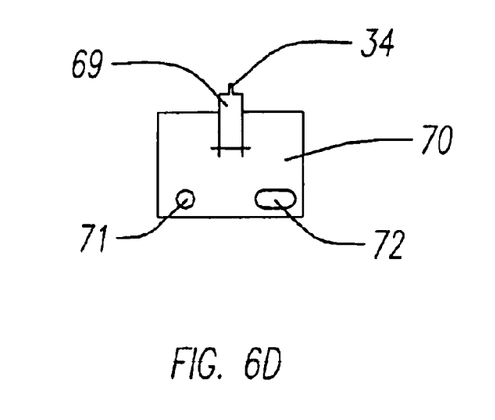
FIG. 6D illustrates, in a plan view, a cantilever chip mount for use with the probe arm of FIGS. 6A–6C.
Figure 6E:
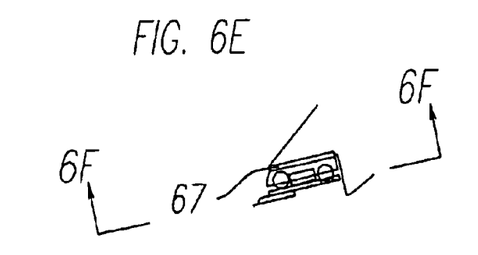
FIGS. 6E and 6F illustrate, in a side elevation view and a bottom plan view respectively, an assembly of the cantilever chip mount with the probe arm.
Figure 6F:
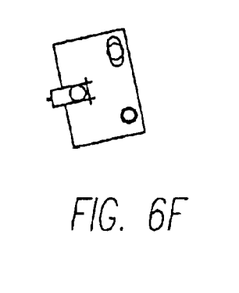

In one embodiment, a kinematic probe mounting mechanism, uses magnets to hold a cantilever chip as shown in FIGS. 6A–6F. A probe arm 61 is attached to z scanner 10. Three balls 62–64 and two magnets 65 and 66 are mounted at the end of probe arm 61 as shown in FIG. 6B. One example of this embodiment uses two ruby balls 62 and 64 and one hardened stainless steel ball 63 for wear resistance. The stainless steel ball is for the electrical contact of the cantilever with a signal line 68. The height of the steel ball 63 is slightly lower than the ruby balls 62 and 64 and the height of the magnets 65 and 66 is slightly lower than the steel ball 63 as shown in FIG. 6C. The magnets 65 and 66 are small disk shaped neodymium and mounted in opposite polarity for stronger holding force. The cantilever chip 69 is attached on a chip mount 70, which is a thin mu metal plate with a hole 71 and a slot 72 as shown in FIG. 6D.

When the chip mount 70 is inserted into an appropriate location at the end of probe arm 61, the two ruby balls 64 and 62 contact with the hole 71 and the slot 72 respectively, while the steel ball 63 contacts a flat surface of the chip mount 70 to provide kinematic mounting in a reliable manner. The heights of three balls and the magnets are arranged in one implementation such that only the balls make contact with the chip mount, while the magnets do not contact the chip mount but come close enough to hold the chip mount with the magnetic force. The width of the chip mount 70 is slightly wider than the probe arm 61. This design of greater chip mount width allows easy replacement of chip mount 70 (and therefore cantilever chip 69) by holding the side of the chip mount with bare hand.

The embodiment described above in relation to FIGS. 6A–6D has the following advantages: 1) With the magnetic holder, it is easier to replace the chip mount and does not require any tools. 2) The position of the chip mount is determined by the two ruby balls. Since the span of the two ruby balls is wider than in the case of 3 slot/3 ball arrangement for a given chip mount dimension, this particular design has a superior reproducibility in the probe position. 3) In non-contact mode AFM, the cantilever is normally vibrated by a modulator 67. In this design, the vibration from the modulator is directly delivered to the cantilever chip through the stainless steel ball, which is just above the cantilever chip. This is advantageous compared to the 3 slot/3 ball arrangement, where the cantilever is mounted between two slots. The vibration is delivered to the cantilever through the thin chip mount plate itself, which can cause spurious vibration modes.

Figure 7A:
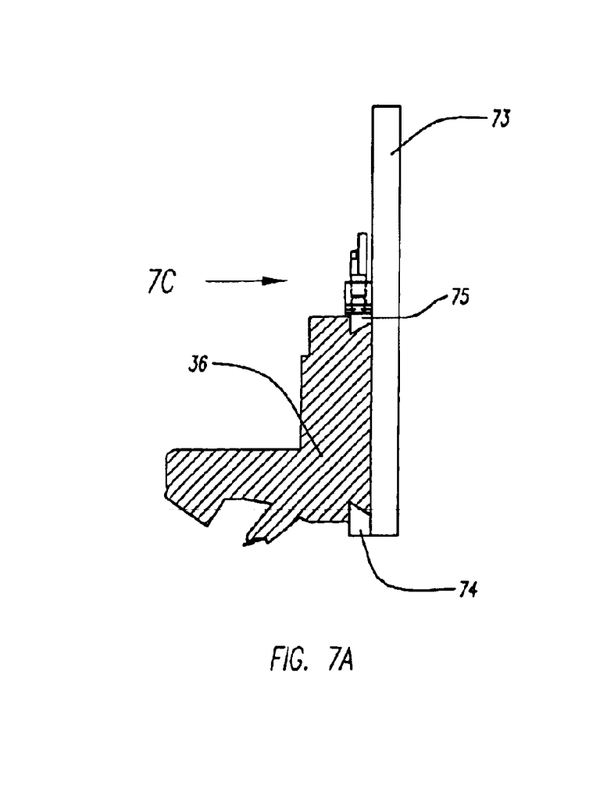
FIGS. 7A–7C illustrate, in a side elevation view, a top view, and a front elevation view respectively an assembly of a probe head to a z stage.
Figures 7B, 7C:
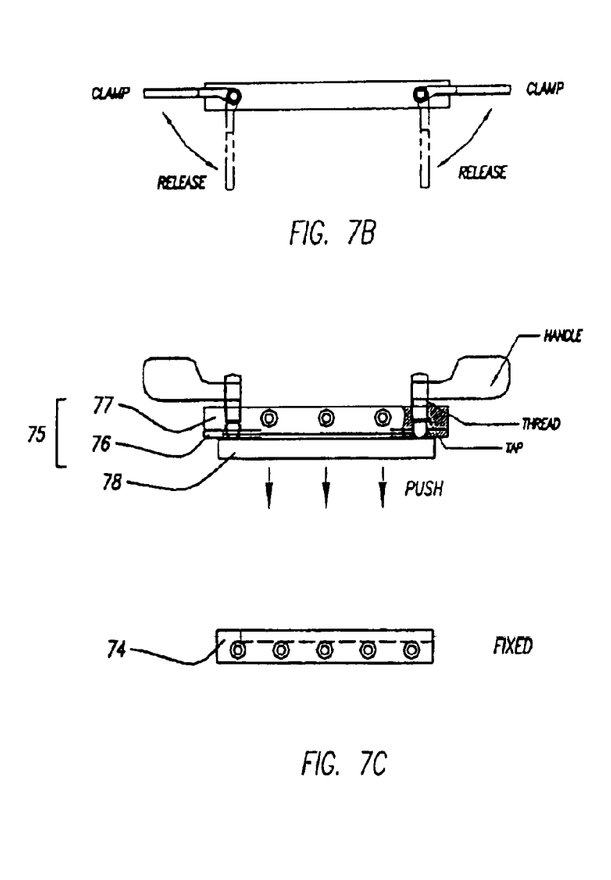
Figure 7D:
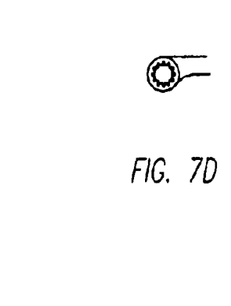
FIG. 7D illustrates, in an enlarged view, a use of a screw in the assembly of FIG. 7B to attach a handle.

A tightening mechanism of a dovetail assembly of the probe head 36 with z stage 73 is illustrated in FIGS. 7A–7D. A bottom dovetail rail 74 is rigidly mounted on the z stage 73. A top dovetail rail 75 has a flexure structure 76 as shown in FIG. 7C. The upper portion 77 of top dovetail rail 75 is rigidly mounted on the z stage but the lower portion 78 can be pushed down by the two screws on each end of the top rail. The screw on the left has a normal right-handed thread, while the screw on the right side has a left-handed thread. Each screw has a removable handle, which can be slid out and re-inserted in any of twelve possible angles as shown in FIG. 7D. A user can select any appropriate angle such that the last 90° turn makes firm clamping (or releasing) of the lower portion 78 of top dove tail rail 75 against the head 36.

Numerous modifications and adaptations of embodiments described herein will be apparent to the skilled artisan in view of the disclosure.

Accordingly, numerous modifications and adaptations of the embodiments described herein are encompassed by the attached claims.

What is claimed is:

1. A scanning probe microscope comprising;
    a stationary frame;
    a scanner supported by the stationary frame; and
    a kinematic mounting mechanism supported by the scanner, the kinematic mounting mechanism comprising three protrusions and at least one magnet, each of the three protrusions and said at least one magnet being located at a first side; and
    a chip mount having a hole, a slot and a flat surface, each of the hole, the slot and the flat surface being located at a second side;
    wherein when second side is sufficiently close to the first side, the chip mount is held by said at least one magnet of the kinematic mounting mechanism, and each of the hole, the slot and the flat surface contact one of the three protrusions in the kinematic mounting mechanism.

2. The scanning probe microscope of claim 1 wherein:
    the heights of the three protrusions and said at least one magnet are such that only the protrusions make contact with the chip mount while said at least one magnet does not contact the chip mount.

3. The scanning probe microscope of claim 1 wherein:
    one protrusion comprises stainless steel and two protrusions comprise ruby.

4. A scanning probe microscope comprising:
    a stationary frame;
    a scanner supported by the stationary frame; and
    a kinematic mounting mechanism supported by the scanner, the kinematic mounting mechanism comprising three protrusions and at least one magnet; and
    a chip mount having a hole, a slot and a flat surface;
    wherein the chip mount is held by said at least one magnet; and
    the scanner is mounted on a one dimensional translation stage, the one dimensional translation stage being attached to the stationary frame, the scanner being limited to linear motion in a direction of motion of the one dimensional translation stage; and
    the scanning probe microscope further comprises a two dimensional flexure stage attached to the stationary frame and a sample chuck mounted on the two dimensional flexure stage, the sample chuck being movable by the two dimensional flexure stage only in a plane perpendicular to the direction of motion of the one dimensional translation stage.

5. The scanning probe microscope of claim 4 wherein:
    the heights of the three protrusions and said at least one magnet are such that only the protrusions make contact with the chip mount while said at least one magnet does not contact the chip mount.

6. The scanning probe microscope of claim 4 wherein:

one protrusion comprises stainless steel and two protrusions comprise ruby.

7. A scanning probe microscope comprising:

a stationary frame;

a scanner supported by the stationary frame;

a kinematic mounting mechanism supported by the scanner, the kinematic mounting mechanism comprising three protrusions and at least one magnet;

a chip mount having a hole, a slot and a flat surface, wherein the chip mount is held by said at least one magnet; and a signal line supported by the kinematic mounting mechanism;

wherein at least one of the three protrusions comprises a conductive material and is in electrical contact with said signal line.

8. The scanning probe microscope of claim 7 wherein:

each protrusion comprises a ball.

9. The scanning probe microscope of claim 8 wherein:

said conductive material is stainless steel; and two balls comprise ruby.

10. The scanning probe microscope of claim 9 wherein:

said ball comprising stainless steel has a height lower than said two balls comprising ruby; and the height of the magnets is lower than each ball.

11. The scanning probe microscope of claim 10 wherein:

the heights of the three balls and the magnet are such that only the balls make contact with the chip mount while the magnet does not contact the chip mount.

12. The scanning probe microscope of claim 9 wherein:

said ball comprising stainless steel is in contact with said flat surface.

13. The scanning probe microscope of claim 7, wherein:

the heights of the three protrusions and said at least one magnet are such that only the protrusions make contact with the chip mount while said at least one magnet does not contact the chip mount.

14. A scanning probe microscope comprising:

a stationary frame;

a z scanner mounted on a one dimensional translation stage, the one dimensional translation stage being attached to the stationary frame, the scanner being limited to linear motion in a direction of motion of the one dimensional translation stage, a kinematic mounting mechanism supported by the z scanner, the kinematic mounting mechanism comprising three balls and a pair of magnets, and a chip mount having a hole, a slot and a flat surface, wherein the chip mount is attached to the kinematic mounting mechanism by the pair of magnets; and a two dimensional flexure stage attached to the stationary frame and a sample chuck mounted on the two dimensional flexure stage, the sample chuck being movable by the two dimensional flexure stage only in a plane perpendicular to the direction of motion of the one dimensional translation stage.

15. The scanning probe microscope of claim 14 wherein:

the heights of the three balls and the magnets are such that only the balls make contact with the chip mount while the magnet does not contact the chip mount.

16. The scanning probe microscope of claim 15 further comprising:

a signal line supported by the z scanner, wherein one bell is in electrical contact with said signal line also contacts said flat surface while two balls other than said one ball contact said chip mount at said hole and said slot.

17. The scanning probe microscope of claim 16 wherein:

said one ball comprises stainless steel; and said two balls comprise ruby.

18. The scanning probe microscope of claim 14 wherein:

said magnets are mounted in opposite polarity.

* * * * *